This invention relates generally to check valves and more particularly to an inexpensive, compact check valve which may be easily and quickly assembled and disassembled, may be easily sanitized, operates under very small differential pressures and which reliably insures that no fluid will flow in the reverse direction.

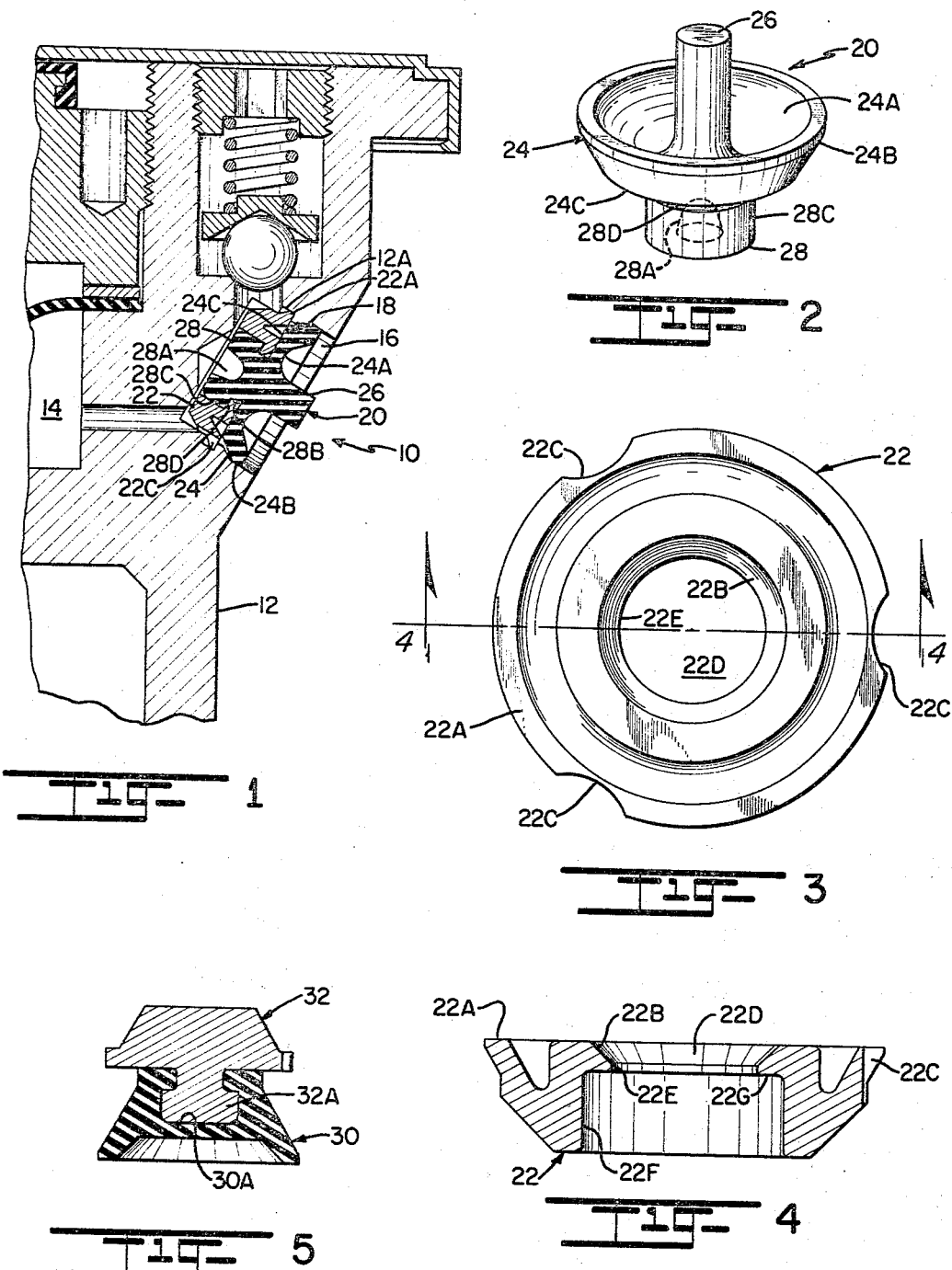
July 18, 1967     R. K. HOFFMAN     3,331,390
CHECK VALVE
Filed July 6, 1964
INVENTOR.
ROBERT K. HOFFMAN
ATTORNEYS 3,331,390
CHECK VALVE
Robert K. Hoffman, Littleton, Colo., assignor to C. A. Norgren Co., Littleton, Colo., a corporation of Colorado
Filed July 6, 1964, Ser. No. 380,327
2 Claims. (Cl. 137—525)

In many applications it is necessary to maintain regulation of unidirectional fluid flow between two chambers where the inlet pressure may be only slightly greater than the outlet pressure and at the same time insure that fluid will not flow in the reverse direction where the outlet pressure greatly exceeds the inlet pressure. Additionally, for reasons of cleanliness and sanitation, it may be required to disassemble the system in which the check valve is installed, including the check valve itself, very frequently and on a periodic basis in order to clean and sterilize thoroughly all the components of the system, including the check valve. It has been found that a reliable, compact, inexpensive to manufacture check valve may be constructed through the use of a circular seal in combination with an annular seat, the periphery of said seal being disposed in sealing engagement with said seat and at least a portion thereof being mounted for torsional flexion in one direction only away from said seat to effect an opening of the valve.

One of the principal objects of this invention is to provide a compact check valve.

Another object of this invention is to provide a highly reliable, extremely compact, inexpensive to build check valve.

Another object of this invention is to provide a compact check valve which may be easily and quickly assembled and disassembled.

Another object of this invention is to provide a check valve utilizing a circular member having a sealing surface formed on the periphery thereof and mounted within a valve such that in order to effect the opening thereof, at least a portion of said periphery is torsionally flexible in one direction only.

Another object of this invention is to provide a compact check valve which operates under small differential pressures.

Another object of this invention is to provide a sanitizable, compact check valve which may be used in dispensing liquids and beverages.

Further objects and features of novelty of the invention will become apparent when referring, for a better understanding of the invention, to the following description taken in conjunction with the accompanying drawings, wherein:

FIG. 1 is an elevational view in cross section taken along the longitudinal axis of a check valve constructed in accordance with this invention, said valve forming an integral part of a larger item;

FIG. 2 is an isometric view of the seal member shown in FIG. 1;

FIG. 3 is a plan view of the seal retainer shown in FIG. 1;

FIG. 4 is a cross sectional view taken along line 4—4 of FIG. 3; and

FIG. 5 is an elevational view in cross section of a modified seal member and seal retainer.

Referring now to the drawings, in FIG. 1 is shown a compact check valve 10 constructed in accordance with this invention and which is incorporated into a component part 12 of a pressurized fluid dispenser, such as a beer dispenser. The compact check valve 10 comprises a body in which is formed an inlet 14, an outlet 16, an annular seat 18, a generally circular seal member 20 and a seal retainer 22. The seal retainer 22 has a flange 22a extending radially outwardly and another flange 22b extending radially inwardly, see FIGS. 3 and 4. Flange 22a has one or more grooves 22c formed therein as shown in FIG. 3 and disposed in a direction preferably parallel to the longitudinal axis of the seal retainer 22. The seal retainer 22 also has an opening 22d formed therein comprising two axially extending surfaces 22e and 22f interconnected by a radially extending surface 22g. Axial extending surface 22e has a smaller diameter than axial extending surface 22f.

The seal member 20 is shown in FIGS. 1 and 2 as comprising a generally circular concave portion 24 with elongated portions 26 and 28 extending outwardly from each side of said concave portion 24. The generally concave surface 24a of the concave portion 24 is disposed opening outwardly toward the outlet 16. The circular concave portion 24 preferably has an axially extending surface 24b formed about the periphery thereof. Elongated portion 26 is preferably cylindrical in shape although other configurations may be used if desired. Elongated portion 28 has a recess 28a formed in the outer end thereof thereby resulting in elongated portion 28 being substantially annular in construction. Elongated portion 28 has an external surface comprising a pair of generally axially extending surfaces 28b and 28c interconnected by a generally radially extending surface 28d. Axially extending surface 28b has a smaller diameter than axially extending surface 28c and is disposed adjacent concave portion 24.

The annular seal retainer 22 being made preferably from plastic is easily press fit into component part 12 until the flange 22a seats in an annular groove 12a formed on component part 12. In this manner seal retainer 22 is firmly mounted to resist movement in an axial direction. However, seal retainer 22 may through the use of an inexpensive tool (not shown) be easily and quickly removed when desired. Seal member 20 is installed by forcing or urging elongated portion 28 through the opening 22d formed in the seal retainer 22 until the axially extending surface 28b is in mating contact with the periphery of flange 22b. Axially extending surface 24b formed on the periphery of concave portion 24 preferably has a diameter slightly greater than the diameter of the annular seat 18. As a result, axially extending surface 24b is maintained in sealing contact with annular seat 18 when the pressure in outlet 16 is equal to or greater than the pressure in inlet 14. Elongated portion 26 facilitates the assembly and disassembly of seal member 20 with respect to seal retainer 22.

In operation, when the pressure in inlet 14 exceeds the pressure in outlet 16 a resultant force is exerted on the back side or inlet pressure side 24c of the concave portion 24 causing at least a portion of the periphery of the concave portion 24 to torsionally flex away from annular seat 18 and toward the longitudinal axis of seal member 20 or toward elongated portion 26 thereby permitting the flow of fluid from inlet 14 to outlet 16. The amount of differential pressure required to torsionally flex the periphery of the concave portion 24 may be varied over a wide range through the appropriate selection of the materials from which the seal member 20 is formed and the diameter of the concave portion 20a. It has been found that through the use of the seal member 20 made from molded rubber having a hardness measuring between 45 and 55 durometer and a concave portion 24 with a diameter of approximately 0.45 inch, a seal member will operate under a differential pressure of approximately 0.3 p.s.i. and, as a result of the back side or inlet pressure side 24c of concave portion 24 being substantially supported by annular seat 18 and seal retainer 22, the check valve 10 will prevent the reverse flow of fluid therethrough even under very high pressure differentials, i.e., where the pressure in outlet 16 greatly exceeds the pressure in inlet 14.

In FIG. 5 is shown a modified version of a seal member 30, constructed in accordance with this invention, and its corresponding seal retainer 32. Seal member 30 works in much the same manner as seal member 20 in that at least a portion of the periphery of seal member 24 is mounted to torsionally flex away from a valve seat when the pressure on the inlet or upstream side thereof exceeds the pressure on the outlet or downstream side. Although the seal member 30 may be easily installed as in the case with seal member 20, since it does not have a part corresponding to elongated portion 26 of seal member 20, separation thereof from seal retainer 32 may require a special tool (not shown) or a modified housing constructed in a manner well known in the art. In addition to the difference just discussed, a further difference between seal member 30 and seal retainer 32 and seal member 20 and seal retainer 22 exists as a result of seal retainer 32 having an elongated portion 32a formed on one surface thereof for mating engagement within a recessed portion 30a formed on the back side of seal member 30.

From the foregoing it will be readily apparent that an inexpensive, reliable, extremely compact check valve has been described which may be easily and quickly assembled and disassembled to facilitate the cleaning of each of the individual parts thereof. Additionally, it will be readily apparent that through the appropriate selection of materials and dimensions a compact check valve may be constructed to operate under very small pressure differentials and yet will prevent the flow of fluid in the reverse direction for very high pressure differentials.

Although the illustrative embodiments of the invention herein set forth have been described in detail to make a full disclosure of the invention, it is to be understood that the particular apparatus described is intended to be illustrative only, and that the various features of the invention may be incorporated in other forms without departing from the spirit and scope of the invention as defined in the subjoined claims.

What is claimed is:

1. A check valve comprising: a body including an inlet, an outlet, an annular seat formed between said inlet and said outlet, a radially inwardly extending flange formed upstream of said annular seat, a generally circular seal member comprising a concave portion having an upstream side, a downstream side, and a periphery mounted for sealing engagement against said seat in a closed condition of the valve, at least a portion of said periphery being mounted for torsional flexure in one direction only away from said seat during operation of the valve, the concave part of said concave portion opening toward said outlet, a first elongated portion extending longitudinally outwardly from the upstream side of said concave portion, said first elongated portion having an axially extending recess formed therein, and a second elongated portion extending outwardly from the downstream side of said concave portion; and seal member retaining means for confining a portion of said first elongated portion to prevent, during operation of the valve, movement of the first elongated portion of said seal member in an axial direction, said seal member retaining means comprising an annular member including a radially outwardly extending flange portion formed adjacent the downstream side of said seal retaining means, said radially outwardly extending flange of said retaining means being disposed in abutting engagement against the radially inwardly extending flange of said body; a radially inwardly extending flange portion being formed on one of said retaining means or said first elongated portion and a reduced diameter portion being formed on the other of said retaining means or said first elongated portion, said radially extending flange portion and said reduced diameter portion cooperating to restrict axial movement of said seal member relative to said seal member retaining means during operation of the valve; said seal member being constructed for installation within or removal from said seal member retaining means upon application of a predetermined amount of force along said second elongated portion; said annular seat and said seal member retaining means cooperating to provide support to upstream surface portions of said seal member to prevent interruption of sealing contact between the seal member and the annular seat when the outlet pressure greatly exceeds the inlet pressure.

2. A check valve comprising: a body including an inlet, an outlet, an annular seat formed between said inlet and said outlet, a radially inwardly extending flange formed upstream of said annular seat; a generally circular seal member comprising a concave portion having an upstream side, a downstream side, and a periphery mounted for sealing engagement against said seat in a closed condition of the valve, at least a portion of said periphery being mounted for torsional flexure in one direction only away from said seat during the opening of the valve, the concave part of said concave portion opening toward said outlet, a first elongated portion extending longitudinally outwardly from the upstream side of said concave portion, said first elongated portion having an axially extending recess formed therein and a reduced diameter portion formed adjacent the upstream side of said concave portion, and a second elongated portion extending outwardly from the downstream side of said concave portion; and seal member retaining means for confining a portion of said first elongated portion to prevent, during operation of the valve, movement of the first elongated portion of said seal member in an axial direction, said seal member retaining means comprising an annular member including a radially inwardly and radially outwardly extending flange portion formed adjacent the downstream side of said seal retaining means, said radially outwardly extending flange of said retaining means being disposed in abutting engagement against the radially inwardly extending flange of said body, said radially inwardly extending flange portion of said retaining means being disposed in contacting engagement about said reduced diameter portion formed on said first elongated portion thereby restricting axial movement of said seal member relative to said seal member retaining means during operation of the valve; said seal member being constructed for removal from said seal member retaining means upon application of a predetermined tensile force along said second elongated portion to cause the part of said first elongated portion disposed upstream of the radially inwardly extending flange of said seal member retaining means to move in a downstream direction past said radially inwardly extending flange of said seal member retaining means; said annular seat and said seal member retaining means cooperating to provide support to upstream surface portions of said seal member to prevent interruption of sealing contact between the seal member and the annular seat when the outlet pressure greatly exceeds the inlet pressure.

References Cited

UNITED STATES PATENTS

| 2,329,960 | 9/1943 | Verheul | 137—525 X |
| 2,859,771 | 11/1958 | Blagg | 137—525 X |
| 2,912,999 | 11/1959 | Kersh | 137—525 X |
| 3,073,339 | 1/1963 | Stelzer | 137—525 X |

FOREIGN PATENTS 344,598  2/1960  Switzerland.

WILLIAM F. O'DEA, *Primary Examiner.*

D. DONOVAN, *Assistant Examiner.*